United States Patent [19]
Berg

[11] 3,845,694
[45] Nov. 5, 1974

[54] END OF STROKE IMPACT REDUCING MEANS FOR LINEAR FLUID MOTORS

[75] Inventor: Lawrance F. Berg, Lockport, Ill.

[73] Assignee: Caterpillar Tractor Co., Peoria, Ill.

[22] Filed: Feb. 15, 1973

[21] Appl. No.: 332,702

[52] U.S. Cl. ................. 91/402, 91/290, 91/293, 91/397
[51] Int. Cl. ............................................ F15b 15/22
[58] Field of Search ............ 91/397, 421, 402, 405, 91/410, 290, 293

[56] References Cited
UNITED STATES PATENTS
1,921,023  8/1933  Chambers ............................ 91/293

Primary Examiner—Edgar W. Geoghegan
Assistant Examiner—William F. Woods
Attorney, Agent, or Firm—Phillips, Moore, Weissenberger, Lempio & Strabala

[57] ABSTRACT

A compact valve assembly rapidly slows end of stroke motion of the piston of a hydraulic cylinder to reduce shocks and the risk of damage to the cylinder or mechanisms operated thereby. A cushioning effect, by restriction of fluid discharge, and a bypass effect, by lowering of driving fluid pressure, is provided at one end of the piston travel while a bypass effect only is provided at the other end of the piston movement. The construction requires no modification of the piston itself and no modification of the cylinder configuration other than the providing of openings in the wall thereof.

5 Claims, 2 Drawing Figures

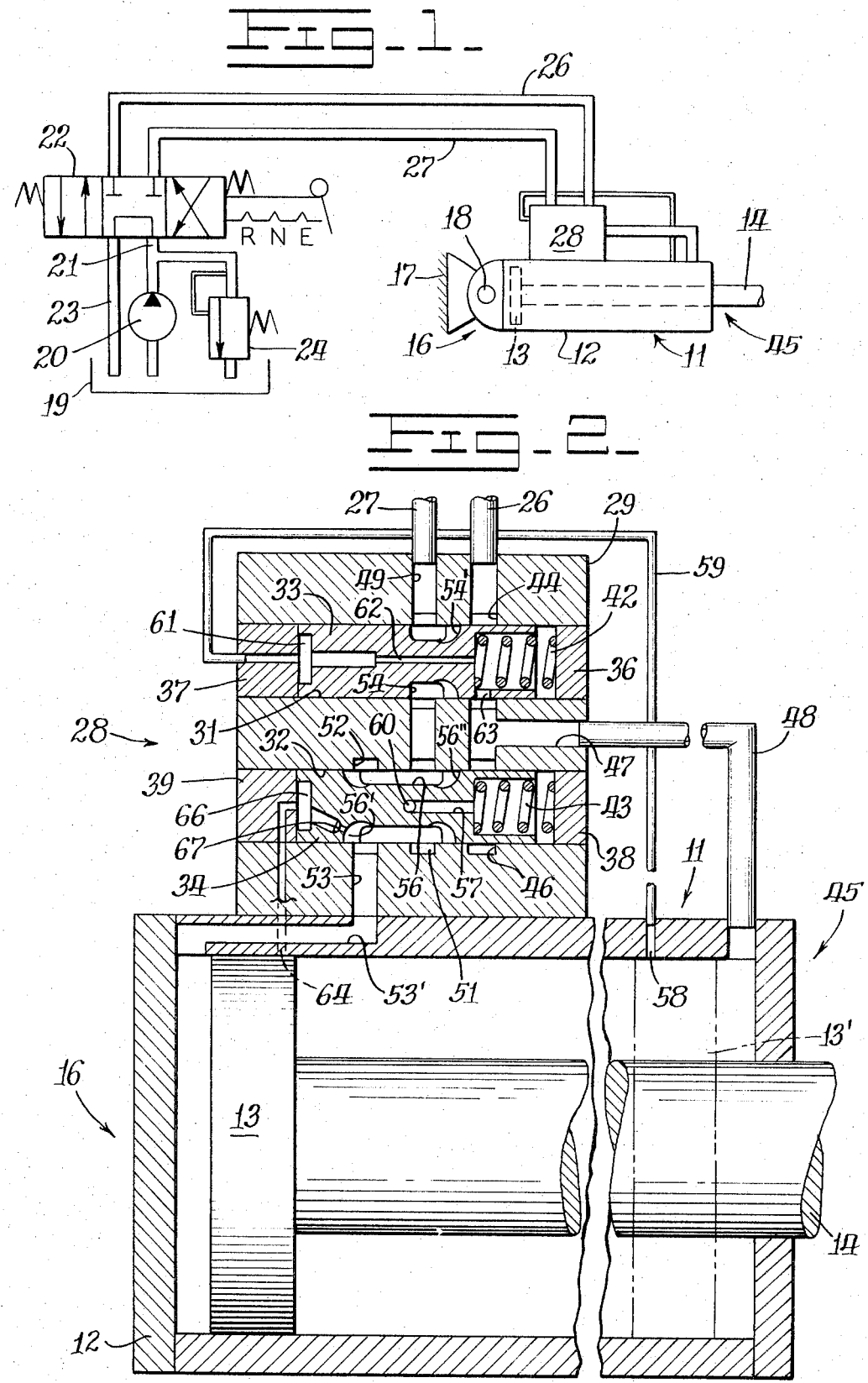

END OF STROKE IMPACT REDUCING MEANS FOR LINEAR FLUID MOTORS

BACKGROUND OF THE INVENTION

This invention relates to linear fluid motors of the cylinder and piston variety and more particularly to mechanisms for reducing impact shocks at the ends of the piston travel.

Linear fluid motors, which are often referred to as fluid cylinders, fluid actuators, fluid jacks or by other terms, have a cylinder with ports at each end and have a piston movable within the cylinder in response to fluid pressure which is admitted through a selected one of the ports while fluid is allowed to discharge through the other port. A rod extends axially into at least one end of the cylinder to transmit piston motion to an external load. Such motors are used to drive or control a variety of devices such as the articulated material manipulating components of earthmoving equipment for example.

Serious problems can be encountered in the operation of linear fluid motors as a result of impact of the piston against the end structure of the cylinder. Such impacts can disturb work operations, cause undersirable noise and can cause damage to the motor itself or to components operated thereby if sizeable shock forces are generated. To reduce or eliminate such shock forces, fluid motors have heretofore been equipped with end of stroke cushioning means or bypass means and in some instances with both. A cushioning means acts essentially to progressively restrict the fluid discharge from the cylinder as the piston approaches the end of travel thereof while a bypass means functions to reduce the flow of driving fluid into the cylinder as the end of a stroke is approached by diverting driving fluid back to the source.

As heretofore constructed, such end of stroke impact reducing means have commonly required substantial modifications and complications of the piston or cylinder or both. The necessary piston modifications may be difficult to provide or may seriously weaken the piston where rod size is large in relation to piston diameter.

In other instances such means have either provided less than the maximum desirable impact reducing effect or have been undersirably bulky and complex. Moreover, such mechanisms are generally either unidirectional in that impact reduction is realized at only one end of the piston travel or else provide identical shock reducing actions at both ends of the piston movement. In many uses of such motors, high impact forces are more probable in one direction of piston travel than in the other since movement in one direction is generally a working stroke in which the piston is slowed by heavy loading while the return movement is generally accomplished under much lighter loading allowing high piston velocity to develop.

SUMMARY OF THE INVENTION

The present invention is an impact reducing means for linear fluid motors or cylinders which requires no modification of the piston and no modification of the cylinder other than the providing of small openings in the wall thereof and which provides a compact simple valve assembly which acts to provide both a cushioning and bypass effect at one end of piston travel, where higher shocks are likely to be encountered, while providing a bypass effect only at the opposite end of piston travel where shocks are normally smaller.

Accordingly, it is an object of this invention to provide a simpler, more compact and economical mechanism which is highly effective to reduce impact shock problems at the limits of travel of a fluid motor.

It is a further object of the invention to provide a mechanism of the form discussed above having a differential action wherein a combination of impact shock reducing actions is provided at one end of travel of the piston of a fluid motor while a single impact shock reducing action is provided at the other limit of piston travel.

The invention, together with further objects and advantages thereof will best be understood by reference to the following description of a preferred embodiment taken in conjunction with the accompanying drawing.

BRIEF DESCRIPTION OF THE DRAWING

In the accompanying drawing:

FIG. 1 is a schematic diagram showing a typical hydraulic linear motor together with a source of pressurized driving fluid and manual control means, and FIG. 2 is a foreshortened axial section view of the motor of FIG. 1 together with a section view of a piston impact shock reducing means in accordance with the invention.

DESCRIPTION OF A PREFERRED EMBODIMENT

Referring initially to FIG. 1, a linear fluid motor 11 is basically comprised of a cylinder 12 in which a piston 13 is disposed for reciprocation in response to fluid pressures selectively admitted to one end of the cylinder. A rod 14 extends axially into one end of the cylinder 12 to couple the piston 13 to an external load. In typical usage, the head end 16 of the fluid motor may be coupled to the structure 17, against which the motor reacts, through a pivot connection 18. To selectively translate the piston 13 within cylinder 12, oil, or other suitable fluid, from a reservoir 19, is pressurized by a pump 20 which transmits the pressurized fluid to the input 21 of a control valve 22 that has a return line 23 to the reservoir. A relief valve 24 is connected between valve inlet 21 and reservoir 19 to relieve excessive pressure in the system. A pair of fluid conduits 26 and 27 connect control valve 22 with fluid motor 11 through a cushion and bypass valve assembly 28 to be hereinafter described in more detail. The control valve 22 may typically be of the known three position manually operated form which is spring centered to a Hold position at which inlet 21 is communicated with discharge 23 to return the fluid from pump 20 to reservoir 19 while both conduits 26 and 27 are blocked. At this Hold position, fluid motor 11 is immobilized. Valve 22 may be operated to an Extend position at which inlet 21 is communicated with conduit 27 while conduit 26 is communicated with discharge 23 to cause the fluid motor 11 to extend and may also be operated to a Retract position at which inlet 21 is communicated with conduit 26 while conduit 27 is communicated with the discharge 23 causing the fluid motor to contract.

As previously discussed, the tendency for severe impact shock to occur at the ends of travel of piston 13 is often greater for one direction of piston movement than for the other. One direction of piston travel is normally a working stroke in which a heavy load slows piston movement while the other direction of piston movement is only lightly resisted and therefore high piston velocities and inertial forces can be generated. Abrupt stopping of the piston during this fast return movement can produce severe shocks in the absence of corrective measures. Whether the highest piston velocities are developed on the Extend or Retract stroke depends on the particular manner in which the fluid motor 11 is connected into a particular system and for purposes of the present example it will be assumed that the highest piston velocities occur during the Retract movement.

Cushion and bypass valve assembly 28 acts to substantially reduce shocks at both extremes of travel of the piston 13 within cylinder 12 and provides two complementary impact reducing actions at the end of the Retract movement in particular.

Referring now to FIG. 2 for an understanding of the detailed construction and operation of cushion and bypass valve assembly 28, the valve body 29 of this assembly may be disposed at the cylinder 12 although it may be situated apart therefrom and be connected thereto by suitable conduits if desired. Valve body 29 has a pair of parallel bores 31 and 32 containing slidable valve spools 33 and 34 respectively. Opposite ends of bore 31 are closed by end members 36 and 37 while opposite ends of bore 32 are closed by end members 38 and 39. A first spring 42 acts between end member 36 and spool 33 to urge the spool towards the head end 16 of fluid motor 11 and a second spring 43 similarly acts between end member 38 and spool 34.

The previously described fluid conduit 26 is communicated with an annular groove 44 in bore 31 and with a similar annular groove 46 in bore 32 and a passage 47 in the valve body, between grooves 44 and 46, connects with a conduit 48 leading to the rod end 45 of cylinder 12. The previously described fluid conduit 27 communicates with a groove 49 of bore 31 situated between bore 44 and end member 37 and also with a groove 51 of bore 32 situated between groove 46 and end member 39. Bore 32 has an additional groove 52, situated between groove 51 and end member 39, which is communicated with the head end 16 of cylinder 12 through a valve body passage 53 and a passage 53' in the adjacent wall of cylinder 12.

Spool 33 has a groove 54 with metering slots 54' positioned to communicate grooves 49 and 44 only after the valve spool 33 has moved away from end member 37 against the action of spring 42. Valve spool 34 has a broader groove 56 positioned to maintain groove 51 in communication with groove 52 when the spool 34 is abutted against end member 39 and has a first set of metering slots 56' which gradually closes such communication as the valve spool is moved away from end member 39 against the action of spring 43 and has another set of metering slots 56'' which increasingly communicates grooves 51 and 46 only after the valve spool 34 has moved away from end member 39. An axial passage 57 in valve spool 34 communicates the region around spring 43 with a radial port 60 opening at spool groove 56 to equalize the pressure in the spring region with that in groove 56.

Under most conditions, spring 42 holds spool 33 against end member 37 and under this condition there is no communication between the fluid paths to opposite ends of the motor 16 past metering slots 54'. In order to move spool 33 against the spring 42 as the piston 13 approaches the rod end of the motor, a small opening 58 is provided in the wall of cylinder 12 in position to receive the high pressure of the driving fluid behind the piston during the final portion of travel of the piston. A fluid line 59 communicates opening 58 with a cavity 61 formed in the end of spool 33 which is adjacent end member 37, which cavity is communicated with the region adjacent spring 42 by a restricted axial passage 62 in spool 33. A radial passage 63 in spool 33 communicates the region around spring 42 with groove 44. Thus, upon the application of high fluid pressure to cavity 61 upon pressurization of opening 58 by movement of piston 13, a fluid pressure differential is developed between the ends of spool 33 which causes the spool to move against the force of spring 42 and thereby increasingly communicate grooves 49 and 44 to bypass driving fluid from conduit 27 directly to conduit 26 and thereby relieve the driving force exerted on the piston 13 of the motor to reduce end of travel impact at the rod end of the motor.

Similarly, a small opening 64 is provided in the wall of cylinder 12 in position to be exposed to the driving fluid pressure behind piston 13 as the piston approaches the end of travel towards the head end 16 of the motor. Opening 64 is communicated with a cavity 66 in the end of valve spool 34 adjacent end member 39, the cavity being in turn communicated with groove 56 through a flow constriction 67 in the valve spool. Accordingly, spring 43 normally holds valve spool against end member 39 and under this condition there is no communication between the fluid flow path to opposite ends of the motor 11 past metering slots 56'. However, as piston 13 approaches the head end of the motor 11, opening 64 is exposed to the high pressure driving fluid and a pressure differential is developed across flow constriction 67 in valve spool 34 causing the spool to move against the force of spring 43. This increasingly communicates the fluid conduits 26 and 27 through metering slots 56'' to again bypass incoming driving fluid directly to the discharge path and thereby relieves the driving force on piston 13 near the end of travel toward the head end of the motor. In addition, impact shock at the head end 16 is still further alleviated by a cushioning effect in that the discharge path for fluid from the motor is simultaneously and progressively reduced at metering slots 56' by the above described movement of the valve spool 34.

While the invention has been described with respect to a single preferred embodiment, it will be apparent that many modifications are possible and it is not intended to limit the invention except as defined in the following claims.

What is claimed is:

1. Mechanism for reducing impact of the piston of a linear fluid motor against the end structure of the cylinder thereof, wherein first and second conduits communicate with first and second ends of said cylinder to transmit pressurized fluid to a selected one of said ends while transmitting discharge fluid away from the other of said ends, wherein piston movement towards said second end tends to occur at greater velocity than does piston movement towards said first end, comprising:

valve body means situated between said conduits and said cylinder and having a first internal passage for communicating said first conduit with said first end of said cylinder and having a second internal passage for communicating said second conduit with said second end of said cylinder, a first valve member movable within said valve body means to communicate said first and second passages in response to application of a first predetermined fluid pressure differential to said first valve member to provide for impact reduction through a bypass action as said piston approaches said first end of said cylinder, means for applying said first predetermined fluid pressure differential to said first valve member only as said piston approaches said first end of said cylinder to bypass driving fluid from said first passage to said second passage of said valve body means, a second valve member movable within said valve body means in response to a second predetermined fluid pressure differential to communicate said first and second passages while simultaneously restricting fluid discharge from said second end of said cylinder to provide for impact reduction through both a bypass action and a cushioning effect as said piston approaches said second end of said cylinder, and means for applying said second predetermined fluid pressure differential to said second valve member only as said piston approaches said second end of said cylinder.

2. The combination defined in claim 1 wherein said first valve member comprises a first valve spool having an unactuated position blocking communication between said first and second passages and having first metering means which increasingly communicates said passages as said spool is moved away from said unactuated position by said first pressure differential, and first spring means urging said first valve spool toward said unactuated position thereof.

3. The combination defined in claim 2 wherein a first opening is provided in the wall of said cylinder in position to be exposed to the pressurized fluid driving said piston as said piston approaches said first end of said cylinder, and wherein said means for applying said first predetermined pressure differential to said first valve member comprises means forming a flow constriction communicating opposite ends of said first valve spool, and means communicating one end of said first valve spool with said first opening and communicating the opposite end of said first valve spool with said first passage.

4. The combination defined in claim 2 wherein said second valve member comprises a second valve spool having an unactuated position at which communication between said second passage and said second end of said cylinder is established while communication between said first and second passages is blocked and having second metering means which increasingly restricts communication between said second passage and said second end of said cylinder while increasingly communicating said first and second passages as said second valve spool is moved away from said unactuated position thereof by said second pressure differential and second spring means urging said second valve spool towards said unactuated position thereof.

5. The combination defined in claim 4 wherein a second opening is provided in the wall of said cylinder in position to be exposed to the pressurized fluid driving said piston as said piston approaches said second end of said cylinder, and wherein said means for applying said second pressure differential to said second valve member comprises means forming a flow constriction communicating opposite ends of said second valve spool, and means communicating one end of said second valve spool with said second opening and communicating the opposite end of said second valve spool with said second passage.

* * * * *